(12) United States Patent
Rousson et al.

(10) Patent No.: US 7,809,190 B2
(45) Date of Patent: Oct. 5, 2010

(54) GENERAL FRAMEWORK FOR IMAGE SEGMENTATION USING ORDERED SPATIAL DEPENDENCY

(75) Inventors: Mikael Rousson, Trenton, NJ (US); Chenyang Xu, Allentown, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 876 days.

(21) Appl. No.: 11/684,785

(22) Filed: Mar. 12, 2007

(65) Prior Publication Data

US 2007/0253611 A1 Nov. 1, 2007

Related U.S. Application Data

(60) Provisional application No. 60/795,660, filed on Apr. 27, 2006.

(51) Int. Cl.
*G06K 9/34* (2006.01)
(52) U.S. Cl. .................................. 382/173
(58) Field of Classification Search ............ None
See application file for complete search history.

(56) References Cited

U.S. PATENT DOCUMENTS 7,095,890 B2* 8/2006 Paragios et al. ............ 382/173
7,177,471 B2* 2/2007 Paraglos et al. ............ 382/173
7,200,269 B2* 4/2007 Paragios et al. ............ 382/215
7,424,153 B2* 9/2008 Paragios et al. ............ 382/173

OTHER PUBLICATIONS

D.L. Collins et al., Automatic 3-D Model-based Neuroanatomical Segmentation, Human Brain Mapping, 3:190-208, 1995.
S.L. Hartmann et al., Automatic 3-D Segmentation of Internal Structures of the Head in MR Images Using a Combination of Similarity and Free-Form Transformations: Part II, Validation on Severely Atrophied Brains, IEEE T. MI, 18(10):917-926, 1999.
R. Kikinis et al., A Digital Brain Atlas for Surgical Planning Model-driven Segmentation and teaching, IEEE T. Vis. Comp. Graphics, 2(3):232-240, 1996.
M. Maddah et al., Automatic Optimization of Segmentation Algorithms Through Simultaneous Truth and Performance Level Estimation (STAPLE), In Proc. MICCAI, pp. 274-282, 2004.
G. Unal and G. Slabaugh, Coupled PDEs for Non-rigid Registration and Segmentation, In Proc. CVPR, pp. 168-175, 2005.
B. Vemuri and Y. Chen, Joint Image Registration and Segmentation, In S. Osher and N. Paragios editors, Geometric Level Set Methods in Imaging, Vision, and Graphics, pp. 251-269. Springer Verlag, 2003.
A. Yezzi et al., A Variational Framework for Joint Segmentation and Registration, In Proc. Workshop on MMBIA, pp. 44-49, 2001.

* cited by examiner

*Primary Examiner*—Yuzhen Ge
(74) *Attorney, Agent, or Firm*—Donald B. Paschburg

(57) ABSTRACT

A general framework to enhance performance of automatic segmentation of a plurality of structures in medical imaging applications incorporates inter-structure spatial dependencies in to existing segmentation algorithms. Ranking the structures according to their dependencies allows a hierarchical approach to automatically segmenting multiple structures that improves each individual segmentation and provides automatic initializations.

9 Claims, 4 Drawing Sheets

GENERAL FRAMEWORK FOR IMAGE SEGMENTATION USING ORDERED SPATIAL DEPENDENCY

CROSS-REFERENCE TO RELATED CASES

This is a U.S. non-provisional application of U.S. provisional patent application Ser. No. 60/795,660, filed Apr. 27, 2006, by Rousson et al., the entirety of which application is incorporated herein by reference.

FIELD OF THE INVENTION

The present invention relates to a method for automatic segmentation of digital image data.

BACKGROUND

Automatic image segmentation is a well-recognized problem medical imaging applications that is being addressed in many different ways. Atlas-based segmentation is one known solution which treats segmentation as a registration problem by elastically matching a pre-segmented atlas to the target image. Examples of such atlas-based segmentations are described by D. L. Collins, C. J. Holes, T. M. Peters, and A. C. Evans, *Automatic 3-D model-based Neuroanatomical Segmentation*, HUMAN BRAIN MAPPING, 3:190-208, 1995; S. L. Hartmann, M. H. Parks, P. R. Martin, and B. M. Dawant, *Automatic 3-D Segmentation of Internal Structures of the Head in MR Images Using a Combination of Similarity and Free-Form Transformations: Part II, Validation on Severely Atrophied Brains*, IEEE T. MI, 18(10:917-926, 1999; and R. Kilkinins, M. E. Shenton, and et al., *A Digital Brain Atlas for Surgical Planning Model-Driven Segmentation, and Teaching*, IEEE T. VIS. COMP. GRAPHICS, 2(3):232-240, 1996. However, atlas-based segmentation approaches are not suited for structures that are not stable over the population.

Another known segmentation method is active shape and appearance models described by T. F. Cootes, D. Cooper, C. J. Taylor, and J. Graham, *Active Shape Models—Their Training and Application*, COMPUT. VIS. IMAGE UND., 61(1):38-59, 1995; T. F. Cootes, G. J. Edwards, and C. J. Taylor, *Active Appearance Models*, IEEE T. PAMI, 23(6):681-685, 2001; and A. Kelemen, G. Székely, and G. Gerig, *Elastic Model-based Segmentation of 3-D Neuroradiological Data Sets*, IEEE T. MI, 18(10):828-839, 1999. These methods assume a statistical correlation between the shape or appearance of the organs over the population which may not be the most accurate assumption for a given individual case.

Thus, there is a continuing need for an improved method of automatically segmenting images in medical imaging applications.

SUMMARY

According to an embodiment, described is a general framework to improve the performance of existing algorithms for segmenting structures in 3-D digital image data such as commonly encountered in medical imaging. This improvement incorporates inter-structure spatial dependencies among structures to enhance segmentation algorithms. Structures are ranked according to their dependencies, segmentation of several structures are carried out according to the resulting hierarchy that improves each individual segmentation and provides automatic initializations. The ordering of the structures according to their dependencies can be predetermined off-line and stored in the image processing system and utilized by the image processing system during segmentation.

According to another embodiment, disclosed is a program storage device readable by a machine, tangibly embodying a program of instructions executable by the machine to perform the method steps for segmenting structures in 3-D digital image data described above. The benefit of the segmentation framework and its methods presented herein is that it enhances the segmentation performance of existing automatic segmentation algorithms by combining the segmentation algorithms into a systematic framework to produce more accurate automatic segmentations of multiple structures in an image.

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
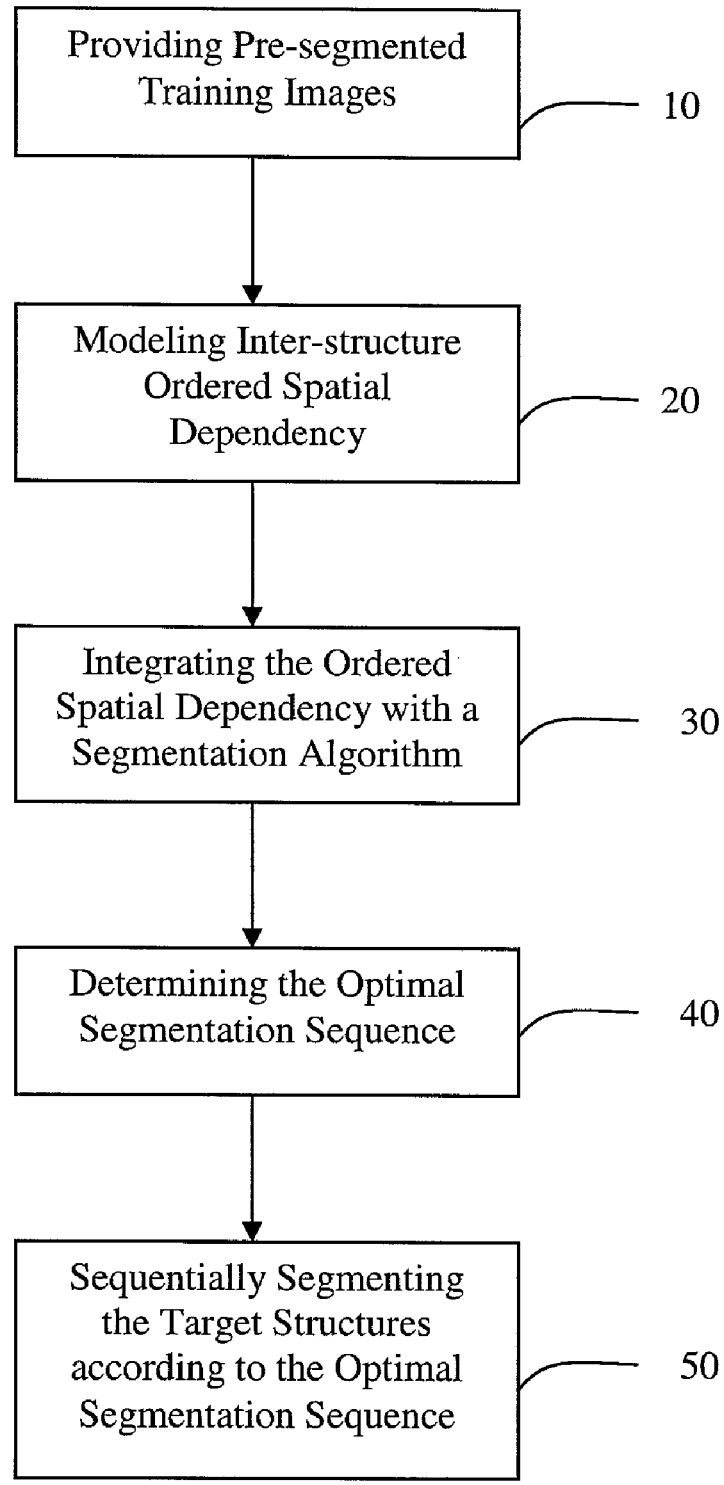
FIG. 1 is a flow chart illustrating the segmentation framework according to an embodiment.

All drawings are schematic illustrations and the structures rendered therein are not intended to be in scale. It should be understood that the invention is not limited to the precise arrangements and instrumentalities shown, but is limited only by the scope of the claims.

DETAILED DESCRIPTION

Different anatomical structures often have strong spatial dependency among each other. This spatial dependency is usually present in a hierarchical manner, i.e., the shape and pose variations of one structure is fully or partially bounded by those of other more stable structures. This type of spatial dependency is referred to herein as "ordered spatial dependency" because of its ordered nature. Radiologists routinely rely on ordered spatial dependency to help them locate and identify structures that have large variations in shape, pose, and appearance by searching its presence relative to other structures that are much easier to identify. The novel image segmentation framework disclosed herein improves segmentation algorithms by taking advantage of this inter-structure ordered spatial dependency in an explicit manner by proposing a novel general image segmentation framework.

The ordered spatial dependency of all possible target structures are determined from pre-segmented training images and stored in the medical imaging system. The pre-segmented training images are preferably created from manually-segmented images. This data bank of ordered spatial dependencies serve as a learned model of the target structures and applied to improve both the performance and robustness of the particular segmentation algorithm utilized.

A key benefit of the segmentation framework is that it can be integrated with any existing segmentation algorithms. Many powerful and effective segmentation algorithms such as seeded region growing (described, for example, in R. Adams and L. Bischof, *Seeded Region Growing*, IEEE T. PAMI, 16(16):641-647, 1994), watershed (described, for example, in L. Vincent and P. Soille, *Watersheds in Digital*

*Spaces: An Efficient Algorithm Based on Immersion Simulations*, IEEE T. PAMI, 13(6):583-598, 1991), active contours (described, for example, in M. Kass, A. Witkin, and D. Terzopoulos, *Snakes: Active Contour Models*, INT'L J. COMP. VIS., 1(4):321-331, 1988 and T. F. Chan and L. A. Vese, *Active Contours Without Edges*, IEEE T. IP, 10(2):266-277, 2001), and graph cuts (described, for example, in Y. Boykov, O. Veksler, and R. Zabih, *Fast Approximate Energy Minimization via Graph Cuts*, IEEE T. PAMI, 23(11): 1222-1239, 2001, and H. Lombaert, Y. Sun, L. Grady, and C. Xu, *A Multilevel Banded Graph Cuts Method for Fast Image Segmentation*, IN PROC. ICCV, pages 259-265, 2005) have been proposed and used widely in particular for medical image segmentation applications. The segmentation framework improves the segmentation results over the particular segmentation algorithm utilized by focusing on segmenting objects in a hierarchical manner using the ordered spatial dependency.

Because structures often have a strong spatial dependency, the segmentation framework disclosed herein involves defining a new spatial prior for the structure of interest based on neighboring structures. This dependency is introduced by registering (or warping) the structure of interest to a common reference coordinate system based on neighboring structures. This can be achieved by computing the elastic matching of the neighboring structures from one image to a reference one, and then applying the same elastic matching to the structure of interest. This modeling can be implemented for each structure, based on the structures already segmented. This leads us to the definition of a hierarchical segmentation framework.

The novel segmentation framework has two important contributions: 1) the explicit modeling and utilization of ordered spatial dependency for segmentation; and 2) the estimation of the optimal segmentation sequence for segmenting multiple structures. Unlike the known atlas-based segmentation methods that treat segmentation as a registration problem by elastically matching a pre-segmented atlas to the target image, the segmentation framework according to an embodiment uses elastic matching to enforce the spatial dependency and restricts the plausible segmentation space rather than using it to obtain the final segmentation. In other words, the segmentation framework models the relative locations of the structures between one another. The actual segmentation of each structure is then performed using a pre-selected segmentation algorithm.

[Modeling Ordered Spatial Dependency]

The segmentation framework and its utility in segmenting multiple structures from MR brain images will be described. Let $\{S_1, \ldots, S_N\}$ be the set of N target structures (classes) to be segmented. Here, $S_N$ denotes N structures in one given subject (i.e. a patient). We assume a dataset of M annotated images to be available for each of the N structures: $\{s_{ij}; i=1,\ldots,N, j=1,\ldots,M\}$. Given a manual segmentation s (e.g. delineation by a doctor) of the target structure $S \in \{S_1, \ldots, S_N\}$, according to the segmentation framework, a smooth approximation of the conditional probability of an image location x (i.e. a voxel x) being inside the structure s is determined to be:

$$ps(x|s) \propto \exp(H_\epsilon(\phi(x))-1$$

where $\phi$ is the distance transform of s and $H_\epsilon$ is a regularized Heaviside function with $\epsilon$ controlling the level of smoothness. This conditional probability of the voxel x is determined for each manual segmentation s. This distribution gives high probability to voxels inside s and low probability to the ones outside, and the smoothness of the transition is related to the distance to the interface. The conditional probability of a voxel x belonging to the background of s as $p\bar{s}(x|s)$:

$$p\bar{s}(x|s) \propto \exp(-H_\epsilon(\phi(x))).$$

Now, to combine all the annotated instances of a target structure $S_i$ to define the spatial prior probability of the target structure $S_i$, the manual segmentations, the annotated images, are placed in a common reference. At this point, the ordered spatial dependency is considered, i.e., $S_i$'s dependency on known neighboring structures. The principle is to align all the manual segmentations $s_{ij}$ of the target structure $S_i$ to a common coordinate system using the known neighboring structures as reference anchor structures. This is done by estimating a warping between each instance of the reference anchor structure(s) to a common reference. The warping is a non-rigid transformation and normalizes the shape(s) of the reference anchor structure(s) to a common reference. For this estimation, each structure instance is represented by a level set function that serves as input of an image-based registration. Such estimation method is described by C. Chefd'hotel in *Geometric Methods in Computer Vision and Image Processing: Contributions and Applications*, PhD thesis, Ecole Normale Suprieure de Cachan, April 2005. When several anchor structures are available, they are merged as a single multi-component one. This allows to constrain even more the deformation field in between the structures and further enhances the accuracy of the resulting segmentation.

Next, these warpings are applied to the corresponding structures $s_{ij}$. Let $\tilde{s}_{ij}$ be the output representing the segmentation transformed by the warping $\psi_{ij}$ and $\tilde{\phi}_{ij}$ be its level set representation, then, the spatial prior probability of the target structure $S_i$ and its background $\bar{S}_i$ are defined in the reference image as the geometric mean of each individual prior probability:

$$ps_i(x) \propto \left(\prod_{j=1}^{M} \exp(H_\epsilon(\tilde{\phi}_{ij}(x))-1\right)^{\frac{1}{M}}, p\bar{s}_i(x) \propto \left(\prod_{j=1}^{M} \exp(-H_\epsilon(\tilde{\phi}_{ij}(x)))\right)^{\frac{1}{M}}$$

A priori, it is not necessarily known which of the known structures can serve as the anchor structures because it is not known which of the known structures the target structure $S_i$ is spatially dependent on. These spatial dependencies are determined by defining the spatial probability according to a subset of other structures $\{S_k, k \neq i\}$. Let $V_i$ represent all possible subsets of $\{S_k, k \neq i\}$, $v_i \in V_i$, the segmented structures, and $v_{ij}$ as the corresponding annotated structures in the training image j. With these notations, all structures $s_{ij}$ are registered to a reference image by estimating the warpings that align $v_{ij}$ to a reference set $v_{i\cdot}$. Therefore, for each choice of subset $v_i$, we end up with different registrations and hence, a different spatial prior probability for the target structure $S_i$. Since this probability is subject to the selected subset $v_i$, the notations $ps_i(x|v_i)$ and $p\bar{s}_i(x|v_i)$ are used to denote respectively the prior probabilities of a voxel to be inside and outside the target structure $S_i$, given a set of known segmentations $v_i$.

[Integrating Spatial Prior in the Segmentation Process]

Next, this spatial prior is incorporated in a general segmentation framework and the complete framework obtained when a level set based approach is considered will be described in detail. Given an image I and a set of segmented structures v, another structure s of the class S is to be segmented in the image I. The class S is any one of the classes $S_i$ considered previously. The statistical formulation of this segmentation problem using a maximum a posteriori estimation involves maximizing the posterior conditional distribution p(s|I,v), or the probability that s is in the image I and in the set of segmented structures v. Making the assumption that I and v are not correlated, the optimal structure is the one maximizing $$p(s|I,v)=p(s|I)p(s|v).$$

The first term can be expressed with any statistically defined segmentation algorithm whereas the second term allows integration of the spatial prior learned above. To incorporate this prior knowledge, an assumption is made that the prior probabilities of the locations x are independent and identically distributed. This allows incorporation of the spatial prior probability term introduced above:

$$p(s|v) = \prod_{x \in s_{in}} ps(x|v) \prod_{x \in s_{out}} p\bar{s}(x|v),$$

where $s_{in}$ and $s_{out}$ are respectively the domain of image inside and outside the structure s. At this point, the formulation is very general and it does not dependent on any particular segmentation algorithm. Hence, any appropriate segmentation algorithms such as graph-cuts (see Y. Boykov, O. Veksler, and R. Zabih, *Fast Approximate Energy Minimization via Graph Cuts*, IEEE T. PAMI, 23(11):1222-1239, 2001; see also, H. Lombaert, Y. Sun, L. Grady and C. Xu, *A Multilevel Banded Graph Cuts Method for Fast Image Segmentation*, In Proc. ICCV, pages 259-265, 2005), and level set based surface evolutions (see M. Kass, A. Witkin, and D. Terzopoulos, *Snakes: Active Contour Models*, INT'L J. COMP. VIS., 1(4):321-331, 1988; see also, T. F. Chan and L. A. Vese, *Active Contours Without Edges*, IEEE T. IP, 10(2):266-277, 2001) can be used to conduct the actual segmentation step.

In the following, an embodiment of the segmentation framework system is developed using the level set based surface evolutions but as mentioned before, the segmentation framework of the invention can be used in conjunction with any available segmentation algorithms. In the level set algorithm, the target structure of interest is represented as the zero crossing of an embedding function $\phi: \Omega \to R : s = \{x \in \Omega | \phi(x) = 0\}$. Hence, the problem of finding the surface s becomes the one of finding a real function $\phi$ that maximizes: $p(s|I,v) \to p(\phi|I,v)$. Equivalently, the optimal solution can be obtained from the minimization of the energy:

$$E(\phi) = -\log p(\phi|I,v) = -\log p(\phi|I) - \log p(\phi|v)$$

In this example, the surface evolutions segmentation algorithm of T. F. Chan and L. A. Vese (see *Active Contours Without Edges*, IEEE T. IP, 10(2):266-277, 2001)) is used to define the first term with a region-based criteria and a regularity constraint. To use the spatial prior (the ordered spatial dependency), the anchor structures from the current image are first registered to the reference anchor structures used for modeling the ordered spatial dependency. Let $\psi$ be the obtained warping, the whole energy is then expressed as follows:

$$E(\phi) = -\int_{\Omega}(H_\phi \log p_{in}(I(x)) + (1-H_\phi) \log p_{out}(I(x)) + v |\nabla H_\phi|)dx - \lambda \int_{\Omega} 100 \log ps(\psi(x)|v) + (1-H_\phi) \log p\bar{s}(\psi(x)|v))dx,$$

where $p_{in}$ and $p_{out}$ are the intensity distributions inside and outside the structures. They can be estimated on-line (i.e. contemporaneously) or a priori from the learning set. We minimize this energy using a gradient descent which is obtained by computing the corresponding Euler-Lagrange equation drives to the following curve evolution:

$$\phi_t = \delta(\phi)\left(v \, div\left(\frac{\nabla \phi}{|\nabla \phi|}\right) + \log \frac{p_{in}(I)}{p_{out}(I)} + \lambda \log \frac{ps(\psi(x)|v)}{p\bar{s}(\psi(x)|v)}\right)$$

$$= \delta(\phi)\left(v \, div\left(\frac{\nabla \phi}{|\nabla \phi|}\right) + \log \frac{p_{in}(I)}{p_{out}(I)} + \frac{\lambda}{M}\sum_{j=1}^{M}(2H_\epsilon(\tilde{\phi}_{cj}(\psi(x))) - 1)\right)$$

where $\tilde{\phi}_{cj}$ stands for the warpings estimated during the modeling phase for the current shape. The segmentation of s is obtained by evolving $\phi$ according to this equation until convergence (the initialization is discussed in the next paragraph). For an efficient implementation, the image $$\sum_{j=1}^{M}(2H_\epsilon(\tilde{\phi}_{cj}(x)) - 1)$$

can be estimated off-line, and then it can be warped to the current image domain using $\psi$.

[Estimation of the Optimal Segmentation Sequence]

To learn the subset $v_i$ that would optimally segment $S_i$, the segmentation is applied on a second set of annotated images. For each $v_i$, one can measure the quality of the segmentation according to a chosen similarity measure Z between the automatic and "true" segmentation. Assuming that, if $S_j$ depends on $S_k$, $S_k$ cannot depend on $S_j$, the objective is to estimate the optimal sequence for segmenting the structures such that structures classified higher can be used to segment lower-classified ones. Once all the segmentations are obtained for a given sequence, the overall quality of the segmentation of the target structures in each of the sequences is measured by comparing the results with the manual segmentation according to a similarity measure Z. Dice coefficient can be used for the similarity measure Z which is defined as twice the Jaccard's Coefficent. This process is repeated for each combination of possible sequence. Then by evaluating/comparing the similarity measures for each sequence, the sequence with the best similarity measure is determined as the optimal sequence is determined. The best similarity measure means that the segmentation is closest to the manual segmentation in the annotated training images. The optimal sequence is given by:

$$\hat{O} = \underset{O \in \mathcal{O}}{\operatorname{argmax}} \sum_{i=1}^{N}\sum_{j=1}^{M} Z(s_{ij}, \hat{s}_{ij}(O)),$$

where O is set of all permissible sequences, and $\hat{s}_{ij}(O)$ is the segmentation obtained automatically in the image j for the structure $S_i$ using the sequence O. In general, if the number of structures to segment is relatively small (<10) all combinations can be tested fairly quickly. If the first structure is fixed, the number of combinations for N structures is equal to (N-1). Even though, this number gets high for N=10, this can be an off-line process and the user can introduce heuristics to reduce the number of possible sequences.

[Hierarchical Segmentation]

Once the optimal sequence is determined, the selected segmentation algorithm is processed for each structure successively by starting with the first structure in the ordering to the last structure. To initiate this process, the first structure necessarily must be segmented without a spatial prior. In most medical images, this can be done easily by fixing the first structure to a generally stable structure, such as, the envelope of the body. For example, when looking to segment structures in the subjects head, the skull will serve well as the first structure. Thus, the segmentation algorithm is run for each structure in the ordering starting with the fixed first structure. Then, to segment each structure, the associated level set also need to be initialized. One solution is to place seeds inside each structure. This would provide a good initialization but requires a user interaction. However, the spatial prior can be used to automate these initializations by selecting the voxels with a prior probability superior to a threshold $\tau$. More precisely, the initial level set $\phi_i^0$ used to extract the structure $S_i$ is set as follows:

$$\begin{cases} \phi_i^0(x) = +1, & \text{if } \log\frac{ps(\psi(x)|v)}{p\bar{s}(\psi(x)|v)} \geq \tau, \\ \phi_i^0(x) = -1, & \text{otherwise} \end{cases}$$

Once initialized with the spatial prior, the level set is projected to a signed distance functions. This is repeated after each iteration of the level set evolution. Using this technique, the segmentation of all N structures can be obtained automatically. Only the weights $\epsilon$, $v$, $\lambda$ and $\tau$ must be set before starting the process.

FIG. 1 is a flow chart 100 illustrating the various steps that comprise the segmentation framework method according to an embodiment. At step 10, pre-segmented training images of structures representing the target structures are provided. At step 20, inter-structure ordered spatial dependency of the target structures is modeled from the pre-segmented training images by placing all pre-segmented training images in a common reference coordinate system using the known neighboring structures as reference anchor structures. At step 30, the ordered spatial dependency is integrated with a segmentation algorithm by registering anchor structures from the three-dimensional image data to the reference anchor structures used in step 20. At step 40, the optimal sequence for segmentation of the plurality of target structures is determined, and at step 50, each of the plurality of target structures are sequentially segmented according to the optimal sequence. The sequential segmentation conducted per the optimal sequence restricts the plausible segmentation space for each subsequent target structure in the sequence to produce enhanced segmentations of the target structures.

EXAMPLE

Hierarchical Segmentation of Brain Structures in MR Images

Referring to FIGS. 2A-4C, the disclosed segmentation framework applied on segmentation of multiple structures of the brain in MR images will be described. Four (4) structures were considered: the lateral ventricle, the caudate nucleus, the thalamus, and the skull. These structures were annotated manually in thirteen (13) different sagittal slices to provide training images.

The first step is determining the optimal segmentation sequence. In this example, looking at the brain image shown in FIG. 2A, the skull 60 is assigned or fixed to be the first anchor structure. This enables the segmentation framework algorithm to automatically segment the first anchor structure.

Figure 2A:
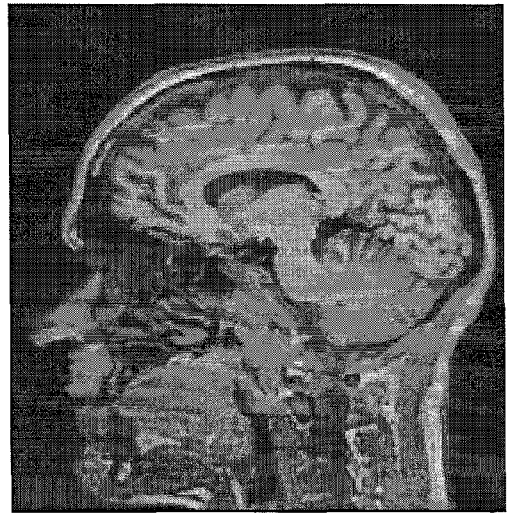
FIGS. 2A-2D are brain MR images illustrating spatial priors corresponding to an optimal ordering according to an embodiment.
Figure 2B:
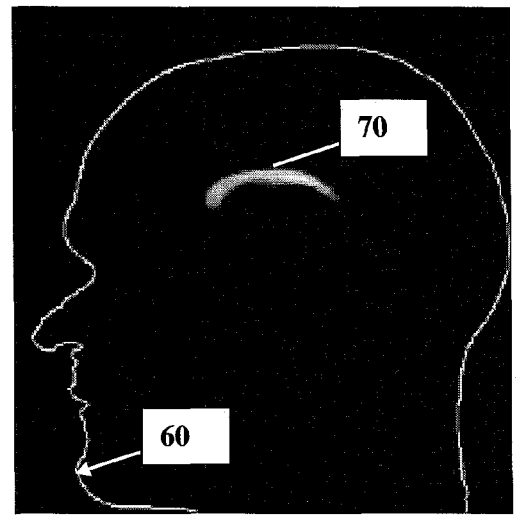
Figure 2C:
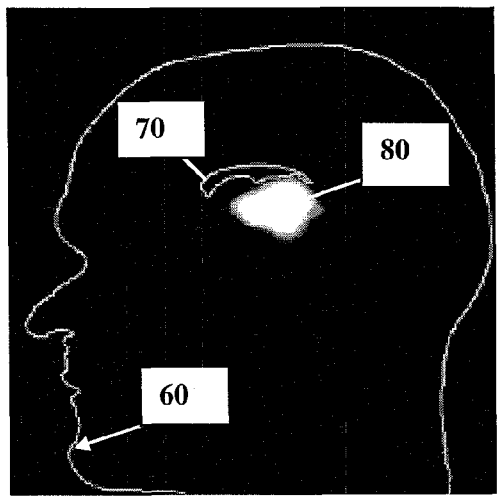
Figure 2D:
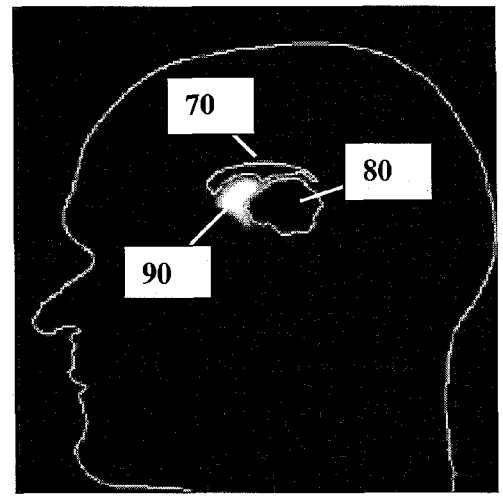
Figure 3:
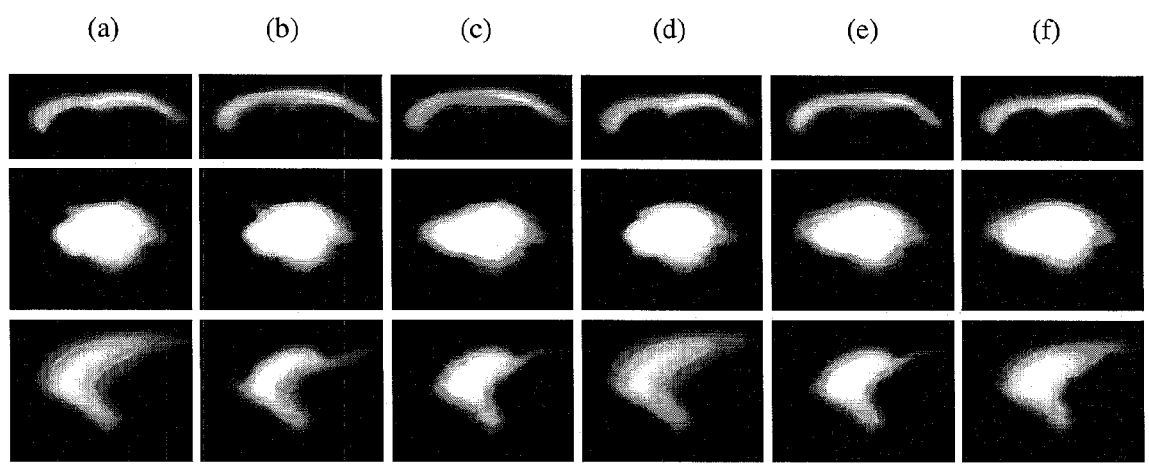
FIG. 3 is an illustration of spatial priors for each possible spatial ordering for a given set of structures.

Initializing the level set with a seed in the background is sufficient to get the first anchor structure skull's segmentation. Then, each structure can be initialized automatically by following the hierarchical segmentation process. The threshold $\tau$ is set to the maximum value of the location prior (or map) J minus 0.1. The threshold values of 0.5 have equal probability to be inside or outside the structure, so, choosing values above 0.9 selects voxels with a high probability to be inside. Since there are four (4) structures, the number of possible segmentation sequences is six (6). After testing the segmentation algorithm for each of the six (6) possible segmentation sequences, the optimal sequence is the one illustrated in FIGS. 2B-2D. FIGS. 2B-2D show the segmentation sequence that maximizes the overall Dice coefficient between the obtained segmentations and the manual ones for the set of thirteen (13) training images mentioned above. FIG. 2B is the spatial prior of the lateral ventricle 70 given the skull 60 as the anchor structure. FIG. 2C is the spatial prior of the thalamus 80 given the skull 60 and the lateral ventricle 70. FIG. 2D is the spatial prior of the caudate nucleus 90 given all other structures. FIG. 3 shows the location priors or maps estimated for each possible segmentation sequence. In FIG. 3, each column (a) through (f) shows the spatial priors obtained for each of the six (6) possible segmentation sequences. The location priors corresponding to the optimal sequence are shown in the column (c). Each of the columns represent the following particular sequences:

Column (a)—sequence (3,1,0,2)
Column (b)—sequence (3,0,1,2)
Column (c)—sequence (3,0,2,1)
Column (d)—sequence (3,1,2,0)
Column (e)—sequence (3,2,0,1)
Column (f)—sequence (3,2,1,0)

where, 0=lateral ventricle, 1=caudate nucleus, 2=thalamus, and 3=skull.

Figure 4A:
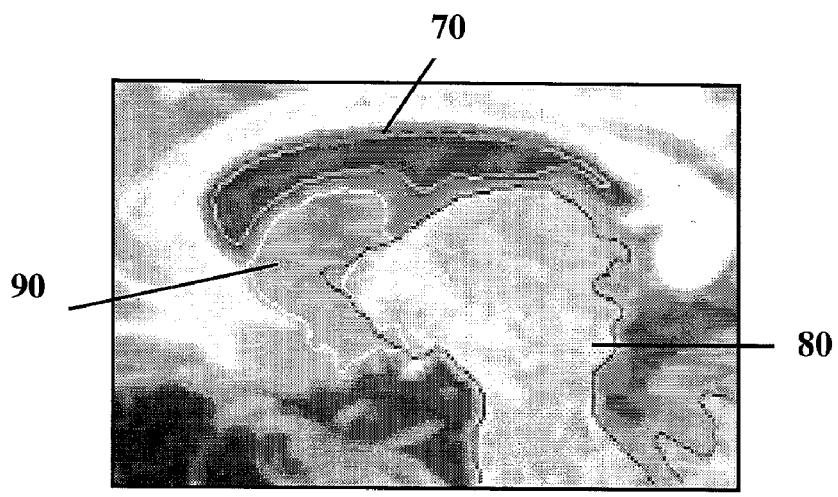
FIG. 4A-4C are illustrations of automatic segmentation according to an embodiment.
Figure 4B:
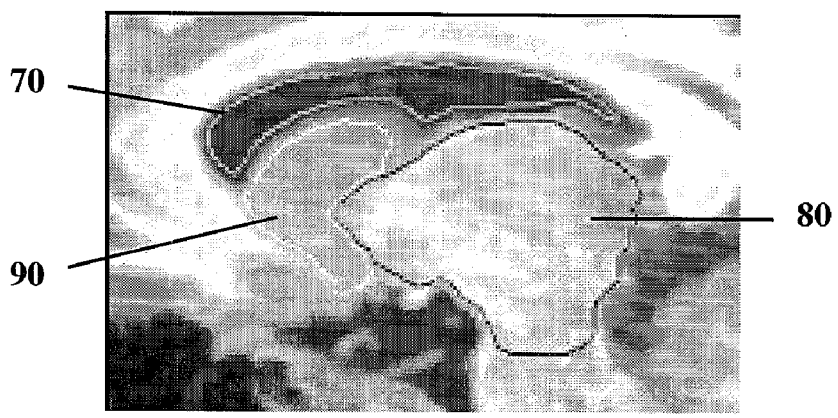
Figure 4C:
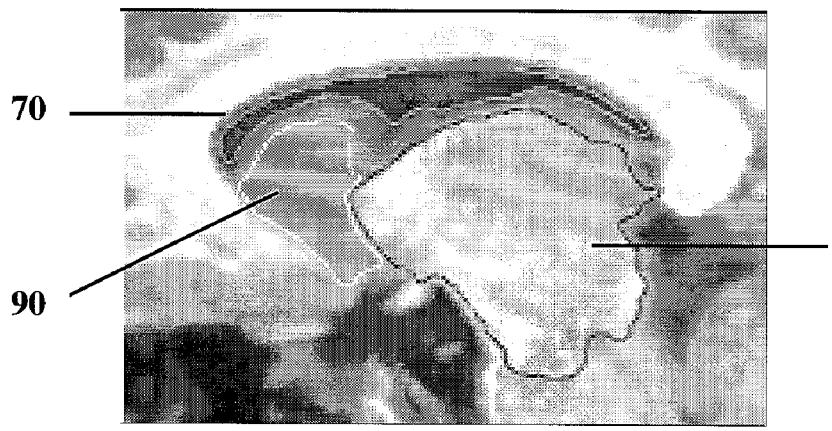

Once the optimal spatial ordering is determined, the approach was validated using a leave-one-out strategy on the thirteen (13) available training images. A few results are presented in FIGS. 4A-4C in which the outlines 70, 80 and 90 represent the results of the segmentation being illustrated in each figure. FIG. 4A is a detailed view of the MR image of FIG. 2A in which the lateral ventricle 70, the thalamus 80, and the caudate nucleus 90 are segmented automatically using the level set surface evolutions algorithm without spatial prior and with manual initialization. Without spatial prior, the segmentation is ignorant of the boundaries of the structures as illustrated by the overlap between the thalamus 80 and the caudate nucleus 90. The thalamus 80 is also shown extending beyond its physical boundary near the bottom of the image. FIG. 4B is the same MR image segmented automatically with spatial prior but not in optimal sequence. As shown, the spatial prior allows the segmentation algorithm from overlapping the structures but the outline of the structures in the segmentation do not follow the physical outline of the structures particularly well. FIG. 4C is the same MR image showing the results of an automatic segmentation with spatial prior in the optimal sequence determined by the segmentation framework according to an embodiment. As shown, the outline of the segmented structures follow the contour of the physical outline of the structures more accurately. As a quantitative validation, the Dice coefficient for each of the 4×13 or fifty-two (52) automatically computed segmentation was computed, giving an average above 0.8.

Therefore, the novel image segmentation framework presented herein is one that learns the ordered spatial dependency among structures to be segmented and applies it in a hierarchical manner to both provide automatic initializations and improve a particular segmentation algorithm's performance. The efficacy of the segmentation framework is demonstrated by applying it to the MR brain image segmentation with level set based surface evolutions algorithm as its segmentation algorithm. The benefit of the segmentation framework presented herein is that it boosts the segmentation performance by combining existing segmentation algorithms into a systematic framework.

The invention described herein can be automated by, for example, tangibly embodying a program of instructions upon a storage media, readable by a machine/system capable of executing the instructions. A general purpose computer is an example of such a machine/system. The computational algorithms discussed herein necessary for manipulation and processing of the digitized image data and the program instructions to execute those algorithms as described herein to conduct automatic segmentation according to the invention can be embodied as a program of executable instructions upon a storage media. Such instructions can be read by the general purpose computer and loaded on to the computer's temporary memory devices (e.g. ROM) or its permanent memory devices (e.g. hard drives), for example, and then a processor on the computer can execute the instructions to perform segmentation on digitized image data. The digitized image data can be provided to the computer from the imaging devices/systems such as CAT systems, MR systems etc. via one of the data input ports provided on the computer as will be obvious to one of ordinary skill in the art. Examples of the storage media are well know in the art and would include such devices as, a readable or writable CD, flash memory chips (e.g. thumb drives), various magnetic storage media, etc.

The essential features of the invention having been disclosed, further variations will now become apparent to persons skilled in the art. All such variations are considered to be within the scope of the appended claims. Reference should be made to the appended claims, rather than the foregoing specification, as indicating the true scope of the subject invention.

What is claimed is:

1. A method for segmenting a plurality of target structures in three-dimensional image data comprising:
   (a) providing pre-segmented training images of structures representing the target structures;
   (b) modeling, using a computer, inter-structure structure ordered spatial dependency for each of the target structures from the pre-segmented training images by placing all pre-segmented training images in a common reference coordinate system using the known neighboring structures as reference anchor structures;
   (c) integrating the ordered spatial dependency with a segmentation algorithm by registering anchor structures from the three-dimensional image data to the reference anchor structures used in step (b);
   (d) determining an optimal sequence for segmentation of the plurality of target structures; and
   (e) sequentially segmenting each of the plurality of target structures according to the optimal sequence thus restricting the plausible segmentation space for each subsequent target structure in the sequence to produce enhanced segmentations of the target structures.

2. The method of claim 1, wherein the step (b) comprises estimating a warping between each instance of the reference anchor structure to the common reference coordinate system.

3. The method of claim 1, wherein the step (d) comprises:
   (f) identifying a group of possible segmentation sequences for the plurality of target structures;
   (g) segmenting all target structures for each possible segmentation sequences using the ordered spatial dependency of the target structures;
   (h) measuring the overall quality of the segmentation of the target structures in each of the sequences by comparing the results with the manual segmentation according to a similarity measure; and
   (i) evaluating the similarity measures for each sequence to determine that sequence with the best similarity measure as the optimal sequence for segmentation.

4. A program storage device readable by a computer, tangibly embodying a program of instructions executable by the computer to perform method steps for segmenting a plurality of target structures in three-dimensional image data, the method steps comprising:
   (a) providing pre-segmented training images of structures representing the target structures;
   (b) modeling inter-structure ordered spatial dependency for each of the target structures from the pre-segmented training images by placing all pre-segmented training images in a common reference coordinate system using the known neighboring structures as reference anchor structures;
   (c) integrating the ordered spatial dependency with a segmentation algorithm by registering anchor structures from the three-dimensional image data to the reference anchor structures used in step (b);
   (d) determining an optimal sequence for segmentation of the plurality of target structures; and
   (e) sequentially segmenting each of the plurality of target structures according to the optimal sequence thus restricting the plausible segmentation space for each subsequent target structure in the order to produce enhanced segmentations of the target structures.

5. The device of claim 4, wherein the step (b) comprises estimating a warping between each instance of the reference anchor structure to the common reference coordinate system.

6. The device of claim 4, wherein the step (d) comprises:
   (f) identifying a group of possible segmentation sequences for the plurality of target structures;
   (g) segmenting all target structures for each possible segmentation sequences using the ordered spatial dependency of the target structures;
   (h) measuring the overall quality of the segmentation of the target structures in each of the sequences by comparing the results with the manual segmentation according to a similarity measure; and
   (i) evaluating the similarity measures for each sequence to determine that sequence with the best similarity measure as the optimal sequence for segmentation.

7. A system for segmenting a plurality of target structures in three-dimensional image data comprising:
   means for storing a program of executable instructions to perform method steps for segmenting a plurality of target structures in three-dimensional image data, the method steps comprising:
      (a) providing pre-segmented training images of structures representing the target structures;
      (b) modeling inter-structure ordered spatial dependency for each of the target structures from the pre-segmented training images by placing all pre-segmented training images in a common reference coordinate system using the known neighboring structures as reference anchor structures;

(c) integrating the ordered spatial dependency with a segmentation algorithm by registering anchor structures from the three-dimensional image data to the reference anchor structures used in step (b);

(d) determining an optimal sequence for segmentation of the plurality of target structures; and (e) sequentially segmenting each of the plurality of target structures according to the optimal sequence thus restricting the plausible segmentation space for each subsequent target structure in the order to produce enhanced segmentations of the target structures;

means for receiving said three-dimensional image data; and means for executing said program of executable instructions whereby segmenting said plurality of structures in said three-dimensional image data.

8. The system of claim 7, wherein the step (b) comprises estimating a warping between each instance of the reference anchor structure to the common reference coordinate system.

9. The system of claim 7, wherein the step (d) comprises:

(f) identifying a group of possible segmentation sequences for the plurality of target structures;

(g) segmenting all target structures for each possible segmentation sequences using the ordered spatial dependency of the target structures;

(h) measuring the overall quality of the segmentation of the target structures in each of the sequences by comparing the results with the manual segmentation according to a similarity measure; and (i) evaluating the similarity measures for each sequence to determine that sequence with the best similarity measure as the optimal sequence for segmentation.

* * * * *